US005348375A

United States Patent [19]

Steininger

[11] Patent Number: 5,348,375

[45] Date of Patent: Sep. 20, 1994

[54] DENTAL PATIENT CHAIR WITH A PIVOTABLE BACKREST

[75] Inventor: Ulrich Steininger, Darmstadt, Fed. Rep. of Germany

[73] Assignee: Siemens Aktiengesellschaft, Munich, Fed. Rep. of Germany

[21] Appl. No.: 890,809

[22] Filed: Jun. 1, 1992

[30] Foreign Application Priority Data

Jun. 10, 1991 [EP] European Pat. Off. ........ 91109501.6

[51] Int. Cl.[5] ............ B60N 2/02

[52] U.S. Cl. ............ 297/362.11; 297/344.14

[58] Field of Search ............ 297/354, 355, 356, 361, 297/362

[56] References Cited

U.S. PATENT DOCUMENTS

| | | | |
|---|---|---|---|
| 2,341,465 | 2/1944 | Monnot | 297/355 X |
| 3,284,135 | 9/1966 | Hiramatsu . | |
| 3,494,663 | 2/1970 | Flint | 297/361 X |
| 3,630,569 | 12/1971 | Lory | 297/355 X |
| 3,719,391 | 3/1973 | Neri . | |
| 4,372,608 | 2/1983 | Hotta . | |
| 4,471,994 | 9/1984 | Zünd et al. | 297/355 X |
| 4,494,795 | 1/1985 | Roossien et al. | 297/355 |
| 4,572,573 | 2/1986 | Yoshikawa et al. . | |
| 4,681,369 | 7/1987 | Simpson | 297/361 X |
| 4,747,640 | 5/1988 | Locher | 297/355 X |
| 4,962,963 | 10/1990 | Robinson | 297/362 X |
| 5,015,035 | 5/1991 | Stoeckl et al. . | |
| 5,024,484 | 6/1991 | Buchacz | 297/361 X |

FOREIGN PATENT DOCUMENTS

| | | | |
|---|---|---|---|
| 1248860 | 8/1967 | Fed. Rep. of Germany . | |
| 2118614 | 6/1973 | Fed. Rep. of Germany . | |
| 3046011 | 9/1981 | Fed. Rep. of Germany . | |
| 3901379 | 10/1990 | Fed. Rep. of Germany . | |
| 1336337 | 7/1963 | France . | |
| 2283664 | 4/1976 | France . | |
| 8300610 | 3/1983 | World Int. Prop. O. | 297/355 |

*Primary Examiner*—Peter M. Cuomo
*Assistant Examiner*—Jerry Redman
*Attorney, Agent, or Firm*—Hill, Steadman & Simpson

[57] ABSTRACT

A dental patient chair is provided with a backrest which is arranged inclinably with a backrest carrier on a seat and is adjusted toward and away from the seat so that the backrest carrier and seat are each, respectively, provided with a curved path in which appropriate guide elements are allocated. As a result, the backrest carrier is moved under the seat when the backrest is inclined backward and, in turn, is withdrawn from within the seat when the backrest is moved forward to an upright position. In order to achieve an optimum motion sequence of the backrest, the curvature of the two curved paths of the seat and the backrest are designed so that the momentary pole around which the backrest turns when being inclined is not constant but, on the contrary, moves on a section of a spiral curve which preferably opens upward and proceeds in the same direction as the incline motion of the backrest.

10 Claims, 4 Drawing Sheets

DENTAL PATIENT CHAIR WITH A PIVOTABLE BACKREST

BACKGROUND OF THE INVENTION

The present invention is directed to a dental patient chair having a backrest that is arranged inclinable relative to the seat on the basis of the backrest carrier and adjustable toward and away from the seat.

Patient chairs having a seat with an adjustable backrest are disclosed, for example, in U.S. Pat. No. 3,719,391, whose disclosure is incorporated herein by reference thereto and which claims priority from the same two Italian Applications as German AS 21 18 614 and U.S. Pat. No. 3,284,135, whose disclosure is incorporated herein by reference thereto and which claims priority from the same Japanese Application as German AS 12 48 860. Even though frequent attempts have been made on the basis of various measurement to place the pivot point for inclining the backrest into the region of the hip joint of a patient situated in a patient chair, the designs proposed up to now have not led to the desired results. For example, among other things, since of the fixed mechanical pivot points that are provided in known chairs usually execute a circular motion, they, therefore, often only approximately reduplicate the motion path of the torso of a patient.

In known patient chairs, dislocations between the patient back and backrest or, respectively, between the head and headrest, therefore, necessarily continue to occur.

SUMMARY OF THE INVENTION

The object of the present invention is to achieve an improvement in the movement of the backrest to a patient chair and to specify a dental patient chair wherein the motion path of the backrest can be even better adapted to the physiological, given motions of the patient.

To accomplish these goals, the present invention is directed to a dental patient chair having a backrest that is inclinably arranged relative to the seat on the basis of the backrest carrier that can be adjusted toward and away from the seat, wherein the backrest carrier and seat are each, respectively, provided with a curved path to which appropriate guide means are allocated and result in the backrest carrier being introduced under the seat when the backrest is inclined backwards and is withdrawable from the seat when the backrest is inclined upright and forward and, thereby, further, the course of curvature of the two curved paths at the seat and backrest carrier are designed so that the momentary pole around which the backrest moves when being inclined is not constant, but moves on a section of a curve, preferably opening spirally to proceed in the same direction as the inclined motion of the backrest.

The measures of the invention are thereby based on the perception that the patient's head does not describe an exact circular path when inclining the backrest, but that the motion sequence represents a combined motion of the spinal vertebra and the hip joint movement. The backrest and seat are, therefore, inventively adjusted relative to one another so that there is not a rigid but a variable pivot point or a dynamic pivot point. This varying pivot point, which is referred to hereinbelow as a "momentary pole", moves on a curve that corresponds to a distorted circular path, preferably in the shape of an ascending spiral. This motion sequence corresponds to the rolling motion of the spinal vertebra, particularly the lumbar vertebra, as a result whereof an optimum matching to the natural motion of the back of the patient is achieved.

The course of curvature of the two curved paths is preferably defined by two circular paths with different radii merging into one another, whereby the radius of the circular path that is spaced away from the backrest is significantly larger than the radius of the circular path which is adjacent to the backrest. A more pronounced displacement of the backrest in the direction of the headrest is achieved by this flattening when raising the backrest.

The ratio of the curvature of radii in the curved path of the backrest carrier advantageously amounts to approximately 1:2. For the curved path of the seat, the ratio amounts to approximately 1:1.5.

Other advantages and features of the invention will be readily apparent from the following description of the preferred embodiments, the drawings and claims.

DESCRIPTION OF THE PREFERRED EMBODIMENTS

Figure 1:
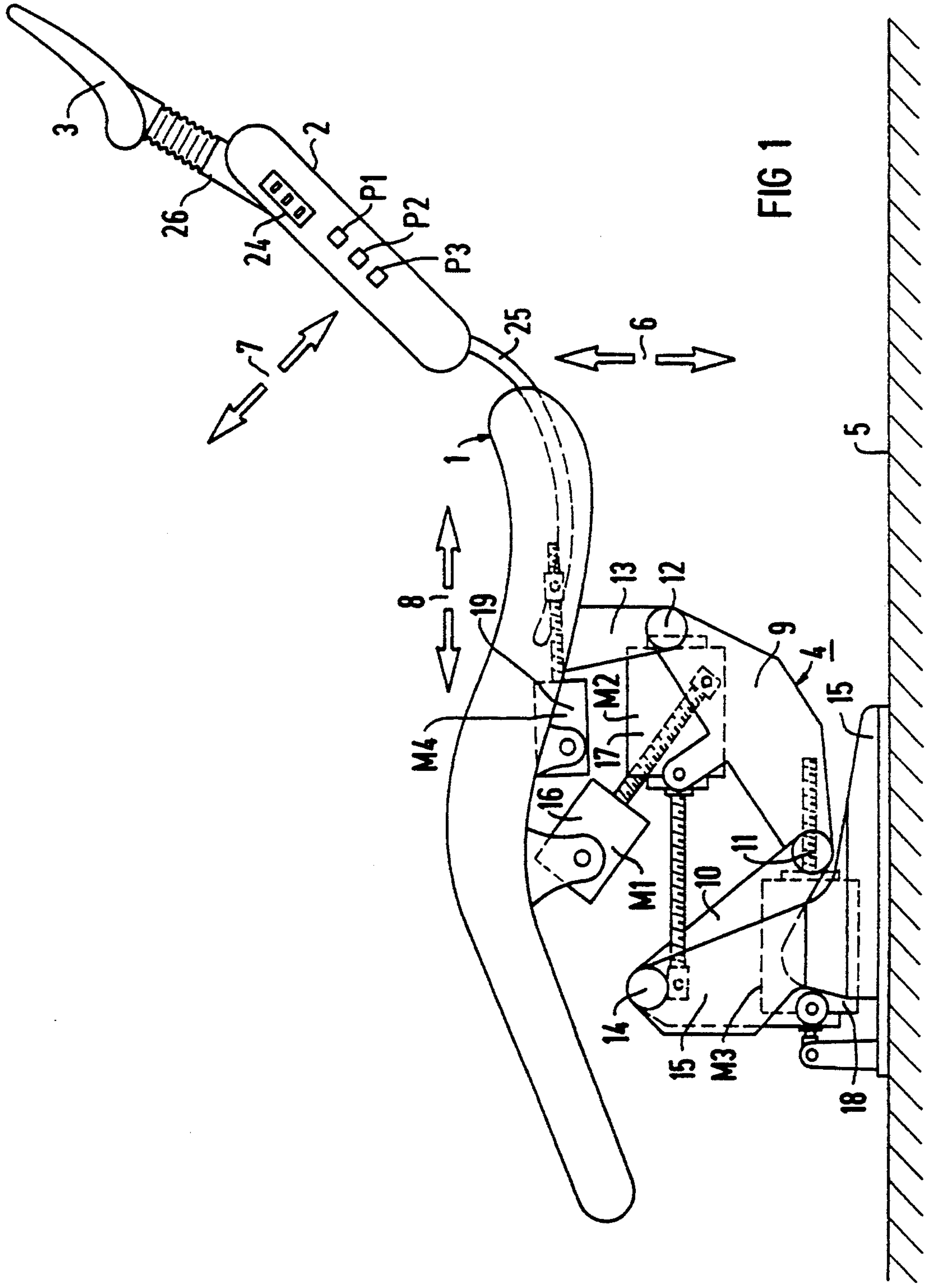
FIG. 1 is a side view of a patient chair in accordance with the present invention with portions removed for purposes of illustration.

The principles of the present invention are particularly useful when incorporated in a dental patient chair illustrated in FIG. 1. The upper chair part is composed of a seat 1 connected to a backrest 2 by a curved brace 25, and the backrest 2 is connected by a headrest carrier 26 to a headrest 3. The seat 1, backrest 2 and headrest 3 are carried by an adjustment mechanism, generally indicated at 4, that is supported on a support plane or floor 5.

Figure 2:
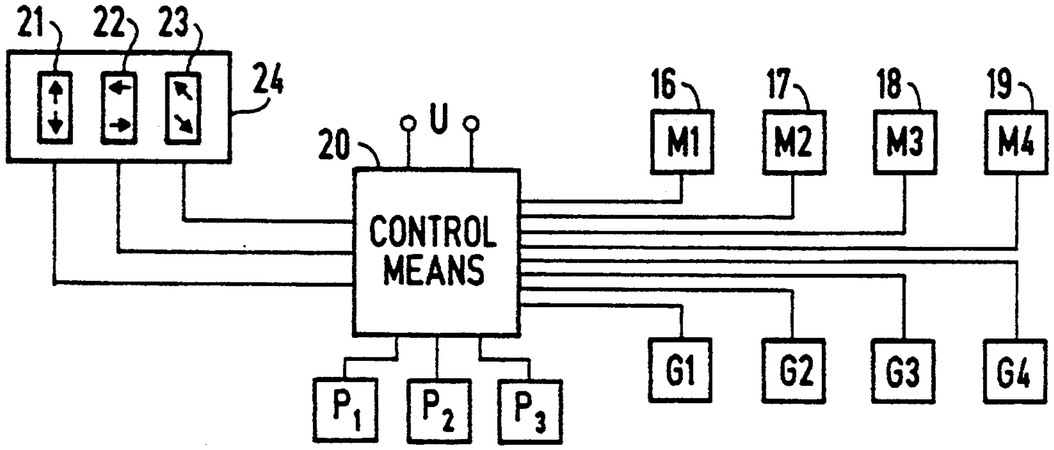
FIG. 2 is a block circuit diagram for the control of the adjustment drive of the patient chair.

The adjustment mechanism 4 is of such a nature that the upper chair part can be adjusted in height according to arrows 6. The backrest can be inclined according to arrows 7. The overall upper chair part can be longitudinally displaced according to the direction of arrows 8 in a horizontal plane. To this end, the adjustment mechanism is composed of two articulated arms 9 and 10, which are connected to one another in an articulate fashion at a pivot joint 11. A free end of the arm 9 is connected by an articulation or pivot joint 12 to a projection 13 of the seat 1 and a free end of the arm 10 is connected by an articulation or pivot joint 14 to a base part 15, which rests on the support plane 5. The two articulated arms 9 and 10 can be adjusted with the assistance of three adjustment drives 16, 17 and 18 so that the entire chair part can be moved in height, as well as longitudinally adjusted. An inclination of the backrest 2 in the direction of arrows 7, as set forth in greater detail later, and is achieved with a further adjustment drive 19. Advantageously, the adjustment drives 16–19 are spindle drives having motors M1–M4 which are driven with a control means 20 of a block circuit diagram illustrated in FIG. 2. The drive can occur in a known way, either with the assistance of individual keys 21–23 which, for example, are combined in a keyboard 24 arranged at the backrest 2 of the chair or with the assistance of program selection keys P1, P2, P3 that are also provided on the backrest. Since the structure of the lower chair part, insofar as its relation to the articulated arms 9 and 10, as well as the adjustment drives 16–18 thereof, is of no significance to the present invention. This mechanism shall not be set froth in greater detail. However, it is described in U.S. Pat. No. 5,015,035, whose disclosure is incorporated herein by reference thereto, and which claimed priority from the European Application which resulted in European Published Application 0 373 245. It should be noted, to promote an understanding, that an exact control of the adjustment motors M1–M3 is necessary in order to obtain a harmonic motion of the seat in a direction along arrows 6 and also arrows 8. To this end, the control means 20 contains a microprocessor that will receive appropriate information from a respective actual position of the particular chair parts via position sensors G1–G4 and that the control means will then drive the adjustable motors M1–M4 in accordance with the desired position. The sensors G1–G4 can be of an electrical, optical or optoelectronic type and can be arranged either at the drives themselves or at the chair parts connected to the drives.

As mentioned before, the backrest 2 is connected to the seat 1 by a backrest carrier in the form of a curved brace 25 so that, on the one hand, it can be inclined forward and backward in the direction of the arrows but, on the other hand, can also execute a motion toward the seat and away from it when being inclined. Before details of the adjustment mechanism required for this purpose are discussed, the structure of the backrest is set forth in greater detail.

Figure 3:
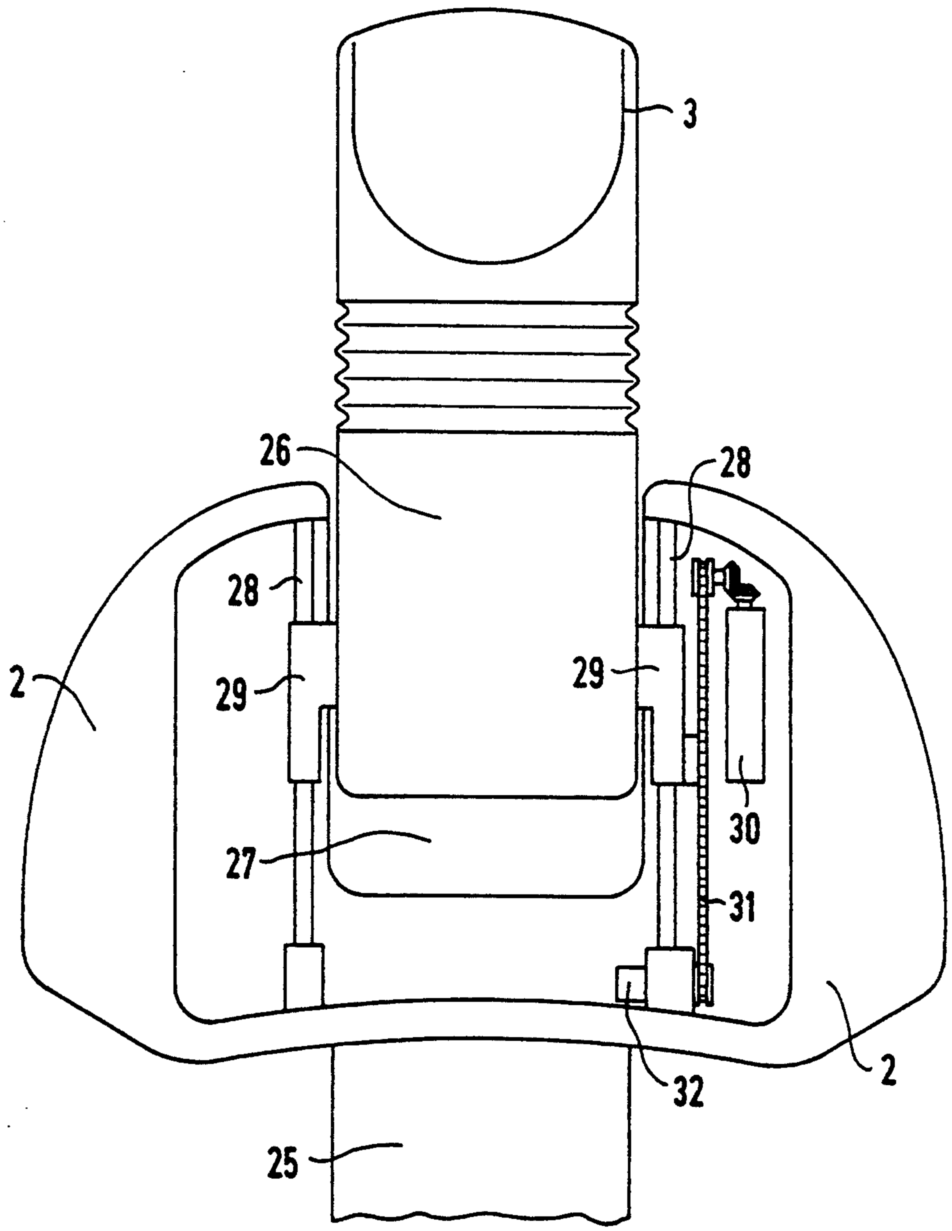
FIG. 3 is a front view of the backrest with the headrest with portions of the padding removed from the backrest.

As illustrated in FIG. 3, the headrest 3 is supported on a headrest carrier 26, which is longitudinally displaceable relative to the backrest 2. To this end, the backrest 2 contains an upwardly open cutout 27 in which at least the lower part of the headrest carrier 26 is received. Means are provided for adjusting the position of the headrest 3 and headrest carrier 26 relative to the backrest 2, which means include guide rods 28 on each side of the opening 27, which guide rods receive guide bushings 29 which are secured to the headrest carrier 26 and will slide on the rods 28 to shift the carrier 26 into and out of the cutout 27. A gear motor 30 is mounted in the backrest 2 and serves the purpose of longitudinal adjustment of the headrest. This gear motor 30 drives a toothed belt 31 secured to one of the guide sleeves 29. A position sensor 32 is also driven with the toothed belt 31 at the same time, so that the exact position of the headrest carrier 26 with reference to the backrest 2 is capable of being acquired or, respectively, prescribed with this position sensor 32. An upper end of the curved brace 25 is rigidly secured to the lower end of the backrest 2, whereas the other end slides in a slideway, as set forth in greater detail with reference to FIG. 4.

Figure 4:
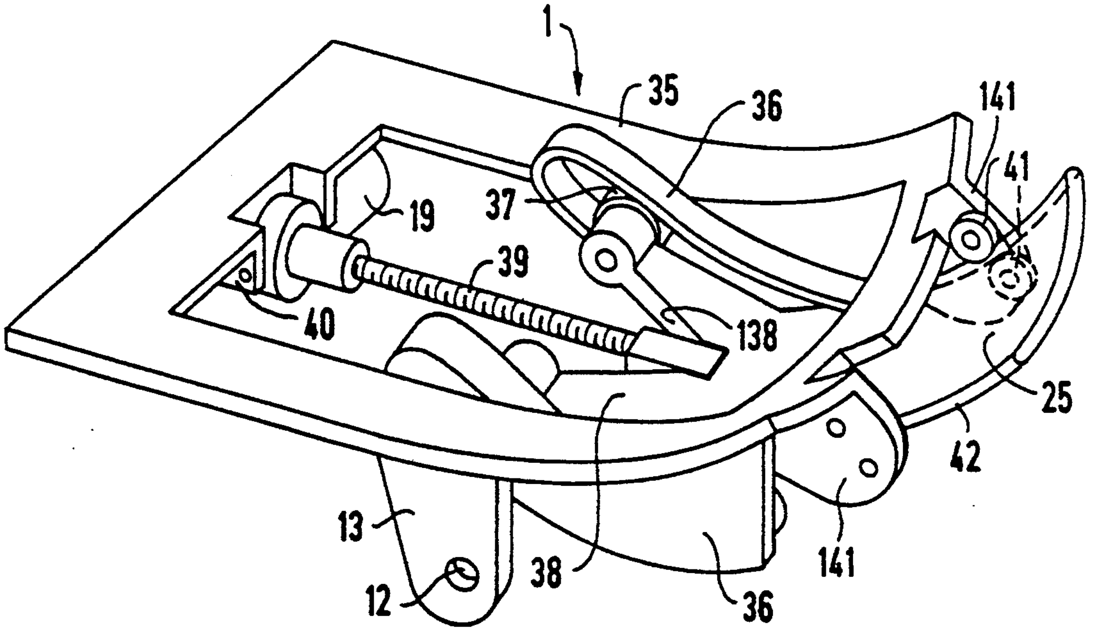
FIG. 4 is a perspective view of a portion of the seat and backrest with the cushions removed.

As best illustrated in FIG. 4, the seat 1, when the cushions and cladding parts are removed, involves a rigid seat frame 35 that is preferably fabricated as a diecast part containing lateral continuations or projections 13 on both sides, which are already indicated in FIG. 1, and accept the articulated joint 12 for the arm 9. The seat frame 35 has a center opening which, on the edges thereof, are provided with guideways 36 which have the form of a continuous link. The curved brace 25, on a lower end, has a pair of arms 38, which are separated by a V-shaped notch 138. Each of the arms 38 support a roller 37 for rotation, and this roller is received in the guideway 36, which controls the position of each of the arms 38. One end of a threaded spindle 39 is pivotably connected in an apex of the V-shaped notch 138 to the plate 25. The other end of the spindle is connected to the adjustment drive 19, which is hingedly mounted to a flange 40 on the seat frame 35. The curved brace 25 and, thus, the backrest secured thereto can move toward the seat or, respectively, away from the seat with the assistance of the spindle drive. In addition, the curved brace 25 is guided by additional guide rollers 41, which are arranged on both sides of the seat frame on projections 141. The curvature of the curved blade 25 referenced at 42, as well as the guidance thereof in the connecting link 36 on both sides and in the two pairs of guide rollers 41, are matched to one another so that a harmonic motion without relative motion between the back of the patient and the backrest is achieved for a patient situated in the chair when inclining the backrest, regardless of whether it is a forward or upright inclination or a backward or lower inclination of the backrest which is involved.

Figure 5:
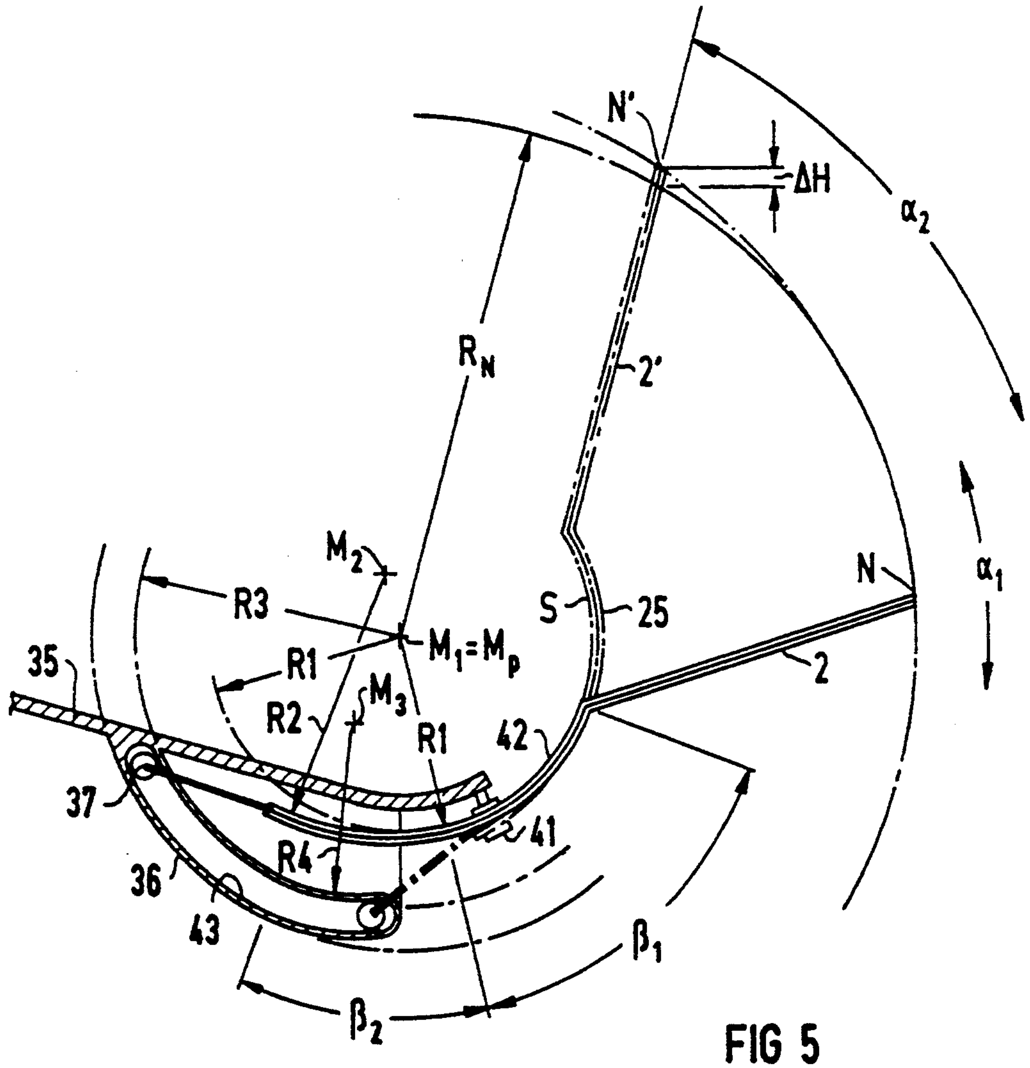
FIG. 5 is a schematic illustration showing the two extreme adjustment positions for the backrest relative to the seat.

The course of the curvature of the curved brace 25 and the curved path of the connecting links 36 are, respectively, formed by a plurality of circular paths having different radii, as set forth with reference to the schematic illustration in FIG. 5.

The curvature 42 of the curved brace 25 and the curved path 43 of the connecting links 36 are essentially defined by two circular paths merging into one another. The two paths for the curvature 42 have the radii R1 and R2 and the two paths for the curvature of the link 36 have the radii R3 and R4, whereby the curved section farther away from the backrest 2 has a larger radius than the sections closer to the backrest. For example, the radius R2 is larger than R1, and the same is true for the curved path, wherein R3 is larger than R4. The ratio of the radii amounts to approximately 1:2 in the case of the curved brace 25 and to approximately 1:1.5 in the case of the curved path of the connecting links or guideways 36. Thus, the curved paths have different centers $M_1$, $M_2$ and $M_3$. The one center $M_1$ lies in the pivot of the hip joint of a patient situated in the chair.

Figure 6:
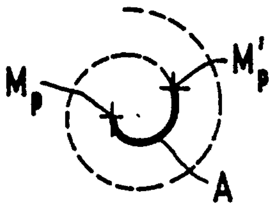
FIG. 6 illustrates a spiral motion path of the momentary pole.

The flattening deriving due to the larger radius R2 in the case of the curved brace or, respectively, on the basis of the radius R3 in the case of the curved path of the connecting link or guideway 36, effects a greater displacement in the direction of the headrest when raising the backrest. Whereas the curved brace and the curved path have approximately the same center in the lower angular range $\alpha_1$ from a horizontal through approximately 30° and a circular motion occurs practically around the center $M_1$. The smaller radius R4 is then taken into effect in the upper angular range $\alpha_2$, which is approximately 60° inclination relative to the horizontal following thereupon, for example, a point N on the backrest moves by a distance $\Delta H$ out of the circular path having the radius $R_N$ upward to a point $N^1$. In this angular range, thus backrest is shifted more greatly in the direction of the headrest. The virtual point around which the backrest moves when being inclined, referred to at the outset as a "momentary pole", is, therefore, not constant. As shown in FIG. 6, the momentary pole or virtual pivot point migrates on a section A of a spiral curve in the exemplary embodiment that proceeds in the same direction with the inclination motion of the backrest which, thus, opens toward the left in accordance with the inclined motion of the backrest toward the front. The movement of the backrest that can, thus, be achieved, corresponds to the natural motion of the hip joint of the patient when the patient is brought from a prone position into an erect sitting position. As already mentioned the ratio of the curvature of radii in the curved path of the backrest carrier advantageously amounts to approximately 1:2. For the curved path of the seat, the ratio amounts to approximately 1:1.5. The relationship of $\beta_1$: $\beta_2$, which define the radii $R_1$ and $R_2$ of the curved brace 25 advantageously amounts to approximately 2:1.

The specification of the radii for the curved course of the connecting links and of the curved brace were empirically found taking the perceptions already recited at the outset into consideration.

Although various minor modifications may be suggested by those versed in the art, it should be understood that I wish to embody within the scope of the patent granted hereon all such modifications as reasonably and properly come within the scope of my contribution to the art.

I claim:

1. A dental patient chair comprising a seat, a backrest, means for mounting the backrest for inclination on the seat, said means for mounting including a curved guideway with a first curved path for the seat and a backrest carrier adjustably moved toward and away from the seat, said backrest carrier being provided with a curved portion having a second curved path spaced from and discontinuous from said first curved path, approximate guide means on the seat and being allocated to the curved portion, the curved portion, curved guideway and guide means coacting so that the backrest carrier will be introduced under the seat when the backrest is inclined backward and is withdrawable from the seat when the backrest is inclined forward, the first curved path of the curved pathway of the seat and the second curved path of the curved portion of the backrest carrier being shaped and spaced from each other so that a momentary pole around which the backrest moves when being inclined is not constant but moves along a section of a curve forming a spiral that proceeds in the same direction as the inclined motion of the backrest.

2. A dental patient chair according to claim 1, wherein the backrest carrier is fashioned with the second curved path of the curved portion having a curvature corresponding to a curvature of the first curved path of the guideway.

3. A dental patient chair according to claim 2, wherein the seat has a seat frame with a pair of spaced connecting links forming the curved guideway and said curved portion of the backrest carrier containing fork-like ends having two arms, with each arm rotatably supporting a guide roller received in the connecting link of the seat frame.

4. A dental patient chair according to claim 3, wherein a motor driven spindle is pivotably mounted on the seat frame and has a free end being pivotably connected to the curved portion of the backrest carrier between said arms.

5. A dental patient chair according to claim 2, wherein the seat frame contains at least two additional pairs of guide rollers for engaging the curved portion of the backrest carrier adjacent each edge thereof.

6. A dental patient chair according to claim 2, wherein the seat frame and the curved portion of the backrest carrier are fabricated as diecast parts.

7. A dental patient chair according to claim 1, wherein the backrest is rigidly connected to the backrest carrier and contains a centrally-placed, upwardly open cutout in which a cushioned headrest carrier part carrying a headrest is mounted for longitudinal displacement therein.

8. A dental patient chair according to claim 1, wherein each of the first curved path and the second curved path is defined by circular paths merging into one another and having different radii.

9. A dental patient chair according to claim 8, wherein each of the first curved path and the second curved path is essentially defined by two circular paths merging into one another, wherein a circular path farthest from the backrest has a larger radius than a circular path immediately adjacent the backrest.

10. A dental patient chair according to claim 9, wherein the radii have a ratio of approximately 1:2 in the case of the second curved path of the backrest carrier and the radii have a ratio of approximately 1:1.5 in the case of the first curved path of a guideway on said seat.

* * * * *